Feb. 21, 1956 L. S. PORTER 2,735,338
OPHTHALMIC DEVICES
Filed July 27, 1950 2 Sheets-Sheet 2
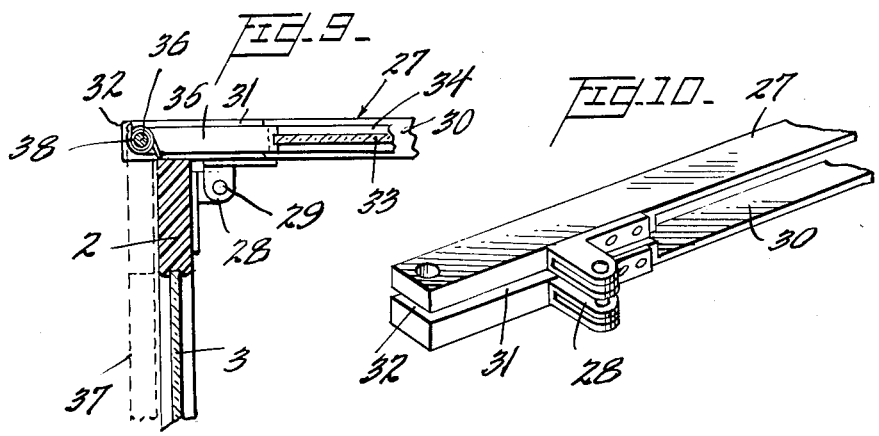
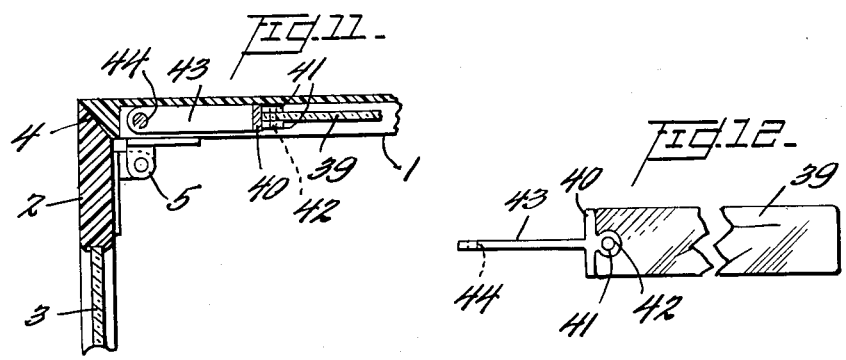
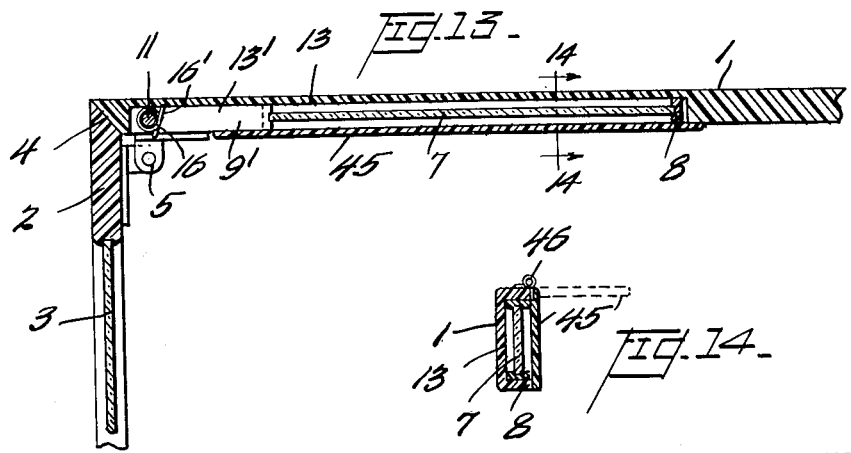
INVENTOR
Louis S. Porter,
BY Bennett H. Levenson.
ATTORNEY United States Patent Office 2,735,338
Patented Feb. 21, 1956

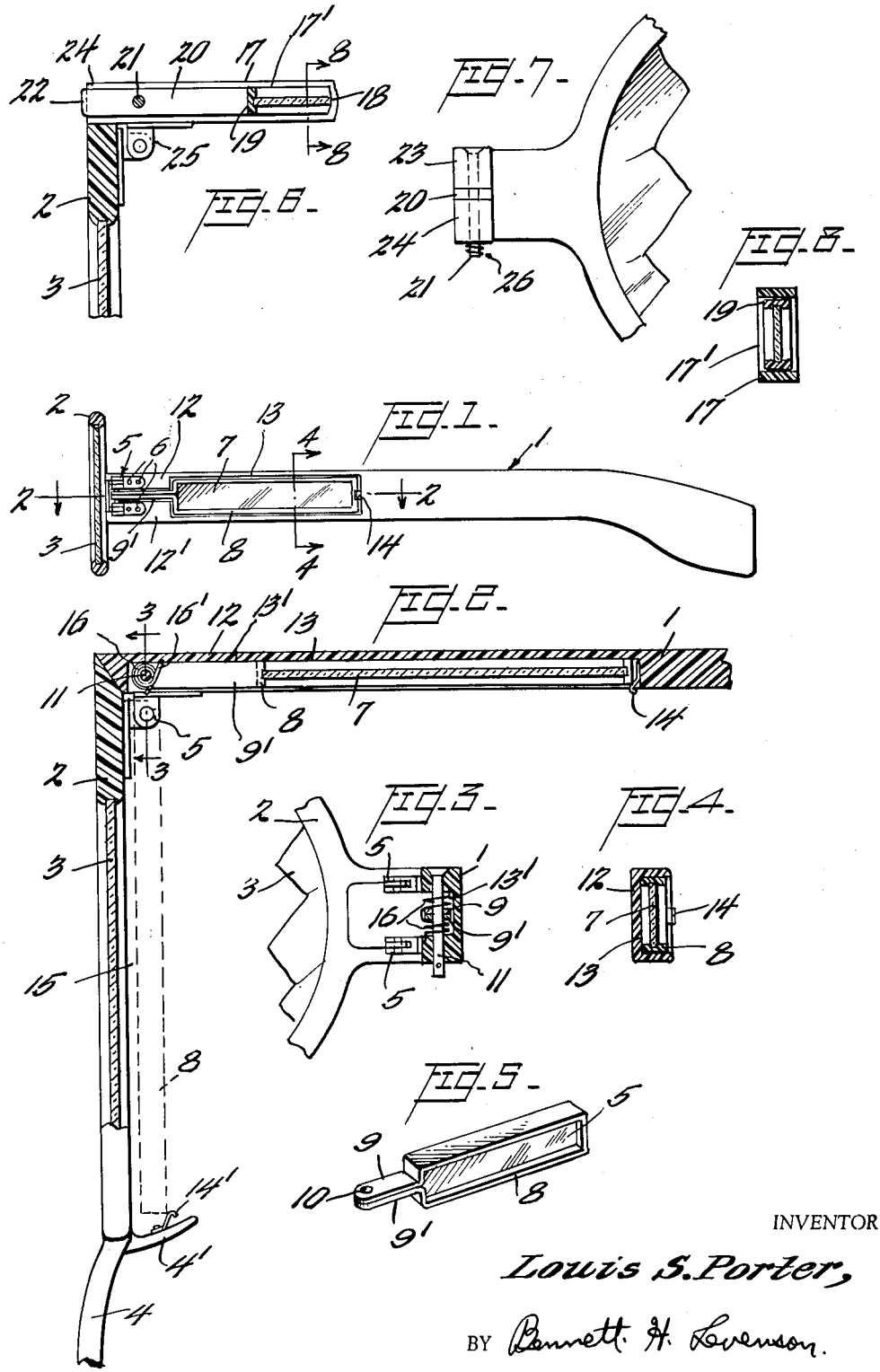

2,735,338

OPHTHALMIC DEVICES

Louis S. Porter, Brooklyn, N. Y.

Application July 27, 1950, Serial No. 176,158

7 Claims. (Cl. 88—52)

This invention relates to the art of ophthalmic devices. More particularly it pertains to lens devices adapted to facilitate vision, especially wherein alternative or auxiliary means are contemplated. While various ramifications of the invention are capable of diversified utilization and function, in its preferred adaption, the invention pertains to spectacles or the like, provided with one or more auxiliary lenses capable of modifying or aiding the vision afforded by the lenses integral with the frame of the spectacles.

The resort to auxiliary lenses as an adjunct to the vision afforded by any given spectacles is generally recognized. This is amply illustrated in connection with bifocal vision, wherein one type of lens is applicable for distant sight and another manifesting appropriate characteristics pertains to close or reading vision.

In lieu of reliance upon two pairs of spectacles, there has been widespread adaptation of bifocal lenses to satisfy the pertinent requirements. Nevertheless and despite their effectiveness bifocal spectacles have been subject to objection for various reasons, psychological and/or practical in their aspects.

Another adaptation of auxiliary lenses is directed to obviating the effect or excessive light intensity or glare. This is illustrated by the expedient of resorting to supplementary spectacles or eyeglasses, superimposed upon normal vision spectacles and provided with lenses capable of minimizing or obviating the difficulty, such as appropriately colored lenses or lenses which manifest a predetermined light polarization. The cumbersome effect of a plurality of spectacles, or the combination of eyeglasses with spectacles, from the standpoint of their simultaneous use, manipulation, or handling has been subject to material crictiscism and objection.

Additional functions of auxiliary lenses within the purport of the present invention are manifested by a reference to various industrial usages, illustrated by the magnifying lens of the jeweler or horologist. Objections comparable with those referred to hereinabove likewise apply in these adaptations and serve to further indicate the prevailing shortcomings of the prior art.

Thus the conjoint use of auxiliary lenses with those of spectacles, also referred to hereinafter as the principal lenses, is of wide and diversified application. In order to facilitate the description of the invention, consideration hereinbelow may be directed to the embodiment pertaining to bifocal vision. It will however be understood that this desirable adaptation is merely illustrative and that any reference thereto is not intended to be limitative of the scope of the invention.

As above indicated, efforts manifested by the prior art in devising spectacles having auxiliary lenses co-ordinated therewith have been relatively cumbersome and/or impractical. Moreover the significant factor of aesthetic effect has been substantially lost or minimized in the devices heretofore available.

Illustratively spectacles have been contemplated wherein the principal lenses are provided at the zone of vision in the usual type of frame mounting, with auxiliary lenses supported in a manner which permits their rotatable positioning contiguous the principal or spectacles lenses, as well as remote therefrom. However such prior art spectacles have been significantly lacking in aesthetic appeal and have presented distinctly undesirable characteristics in their practicable aspects, especially since the mounting and positioning of the auxiliary lens or lenses, whether or not in use, have in effect comprised objectionable protuberances. Moreover and as a result thereof, a detrimental effect has been manifested in the improper fitting of the spectacles, and/or distinct element of discomfiture, particularly where the auxiliary lens or lenses have been mounted adjacent the inner surface of the temple or temples, or have been supported for use contiguous the inner surface of the spectacles lenses.

It is an object of this invention to obviate difficulties and objections of the type hereinabove described.

Another object is to provide spectacles or eyeglasses supplied with an auxiliary lens or lenses, and wherein the aesthetic significance or appeal is either entirely unaffected, or is substantially enhanced thereby.

An additional object is to obtain spectacles or eyeglasses supplemented by auxiliary lenses which may be substantially unobstrusive when not in use.

An important object comprises an auxiliary lens or lenses coordinated with spectacles, without constituting a protuberance when in a position of non-use.

A further object involves spectacles provided with an auxiliary lens or lenses which may be relatively concealed within the body of the temple when in a position of non-use, and adapted for positioning in the zone of vision.

A significant object of the invention is to attain spectacles provided with an auxiliary lens or lenses which are rotatable into the zone of vision or use, and which may be rotated to a relatively unobtrusive position of non-use without detrimental effect.

Other objects, advantages and features of the invention will become apparent from the following description read in connection with the accompanying drawings, in which similar elements are designated by like numerals.

Fig. 1 presents an elevational inside view of a temple comprising a modification of the invention, with the attached spectacles frame and lens shown in fragmentary section.

Fig. 2 comprises a relatively enlarged sectional plan view taken along the line 2—2 of Fig. 1.

Fig. 3 is a vertical section, viewed along the line 3—3 of Fig. 2, disclosing details of the relative attachment of the temple and spectacles frame.

Fig. 4 indicates a vertical section taken along line 4—4 of Fig. 1.

Fig. 5 is directed to a perspective view of an auxiliary lens with its supporting or mounting frame.

Fig. 6 provides a fragmentary horizontal sectional view, showing jointure details between a spectacles frame and another modification of temple.

Fig. 7 deals with a front elevational end view of the modification of Fig. 6, showing the attachment of the spectacles frame to the temple.

Fig. 8 is a vertical section taken along line 8—8 of Fig. 6.

Fig. 9 relates to another modification of the invention, wherein the auxiliary lens is adapted for outward rotation to a position in front of the spectacles frame.

Fig. 10 comprises a fragmentary isometric showing of the temple contemplated in Fig. 9, the auxiliary lens and its mounting being omitted.

Fig. 11 is a fragmentary sectional view of a temple and spectacles frame combination, similar to that of Fig. 2, but involving a modification of the auxiliary lens supporting or mounting means.

Fig. 12 presents in elevational detail the auxiliary lens and mounting contemplated in Fig. 11.

Fig. 13 is directed to a fragmentary horizontal section of a further modification of the invention, particularly with reference to the temple characteristics.

Fig. 14 is a cross sectional view taken along line 14—14 of Fig. 13.

Referring more particularly to the details and features of the invention as illustrated by the various figures of the drawings, the modification shown in Figs. 1–5 embodies the temple 1, comprising a temple-bar, attached to spectacles frame 2, the latter provided with a light transmitting element or lens 3 which will ordinarily conform with the requisites for normal vision. A fragmentary portion of the bridge 4 is indicated, while 4' designates a nose element.

The jointure between the temples and spectacles frame comprises hinge means 5 which permits relative movement of the temple and spectacles frame in the usual manner. The said hinge means may be secured to the temple 1 in any expedient manner as by rivets 6 which fasten the hinge plates to end portions 12, 12' of temple 1.

The auxiliary light transmitting element or lens 7 may be of any predetermined design or configuration, and as shown in Fig. 5 is rectangular in form. The said lens 7 may be positioned within an appropriate frame 8, which may have a configuration comparable with that of said lens 7. The mounting frame 8 may be of any predetermined material, such as metal or synthetic resin in accordance with the usual types of materials utilized for lens frames. Blade elements 9, 9' are shown extending from, and integral with the said frame 8, the blades being provided with openings 10 for reception of pin 11. In effect pin 11 is fixed in end portions 12, 12' of temple 1, and passes through openings 10 of blade elements 9, 9', thereby positioning the said mounting frame 8 relative to temple portions 12, 12'.

Accordingly pin 11 comprises the pivot upon which the assembly, including blade elements 9, 9' and auxiliary lens 7 together with its mounting frame 8, are adapted to rotate, as a result of the characteristics of the temple structure.

In this connection, temple-bar 1 is provided with a recess or blind rabbet 13 on its inner surface to receive auxiliary lens mounting 8 and the said recess or blind rabbet 13 communicates with slot 13', within which spring blades 9, 9' are positioned. Thus the term "recess" and the term "slot," as utilized herein, may be of essentially similar significance, except that they pertain to different portions on the temple and are generally of different dimensions and/or configuration relative to each other. A spring clip 14 is indicated for retaining the auxiliary lens frame or mounting in its position within the adjacent recess 13.

It will be seen that the recess 13 and its slot extension 13' are substantially enclosed within the body of temple 1, and are essentially invisible from the outer surface of the temple shown in Figs. 1–4. Accordingly the frame or mounting 8 together with the auxiliary lens 7 therein may be retained in concealed position within the body of the temple during any interval of non-use. When it is desired to rotate the auxiliary lens 7 into the zone of vision 15, it is merely necessary to extend spring clip 14 somewhat away from recess 13, in order to permit frame mounting 8 and the lens therein to move out of the said recess 13.

Pursuant to the modification of Figs. 2–4, and shown particularly in Fig. 2, the zone of vision, indicated by dotted lines, is positioned contiguous the inner surface of lens 3. After use of auxiliary lens 7, it may be returned to recess 13 by rotating its mounting 8 about pivot 11 back to its concealed position within recess 13, it being merely necessary to draw spring clip 14 sufficiently away from the recess to permit mounting 8 to be seated therein.

Desirably the assembly, comprising the lens and its frame mounting, may be actuated in any expedient manner, such as by a spring element, adapted to rotate the same to its position in the zone of vision and/or to its position of non-use within the temple. Likewise a retention means 14', similar to clip 14, may be provided on the spectacles frame, as on the rear surface of nose element 4', for maintaining the auxiliary lens and its mounting in the zone of vision. Where the nose element is of the floating or pivotal type, spring clip 14' may be affixed to the nose piece support.

Thus spring element 16 is shown for actuating the auxiliary lens and its mounting from recess 13 to said zone of vision 15. On retracting spring clip or detent 14 sufficiently to permit egress of the said assembly, including auxiliary lens 7 and its supporting frame 8, from recess 13, spring member 16 will rotate the same to the aforesaid zone of vision 15. When it is desired to return the auxiliary lens to its concealed position within temple 1, it is merely necessary to manually rotate the auxiliary lens assembly into its recessed position 13, after retracting spring clip 14.

Accordingly when the auxiliary lens assembly is seated in recess 13, spring member 16 is under tension, and the spring clip 14 functions as a locking member preventing the assembly from rotating out of recess 13 to said zone of vision. The spring member 16 is shown enveloping pivot pin 11, relative to which the auxiliary lens assembly is adapted to rotate. The respective ends of spring member 16 comprise hook elements 16', which are fixed to the temple 1, as shown in Figs. 2 and 3, for example.

In the event that it is desired to cause the actuation of the auxiliary lens assembly from the zone of vision to recess 13, it is merely necessary to utilize a reverse version of spring member 16. Under such circumstances, the spring will be in tension when the assembly is in said zone 15 and thus must be retained by any appropriate means, such as a clip member 14', similar to clip 14, affixed to the spectacles frame, as behind nose piece 4', and adapted to function as a locking device. On retracting this locking device, the said reverse spring will rotate the auxiliary lens assembly to recess 13, at which point the spring member would be relaxed, or substantially free from tension.

Since the outer surface of temple 1 in the modification of Figs. 1–4 is essentially unaffected by the seating of the auxiliary lens assembly in recess 13, when the spectacles are being utilized for normal vision, the overall appearance of the spectacles may be unaltered, and the auxiliary lens assembly does not comprise an objectionable protrusion against the face of the wearer. This modification however lends itself to desirable aesthetic appeal where the temple is transparent or clear, such as the characteristic appearance of uncolored Lucite. By providing the auxiliary lens with a dark colored frame mounting, for example, this will be apparent from the outside of the temple, and the particular configuration of the mounting with the lens therein may manifest a distinctly ornamental effect.

The auxiliary lens frame of Fig. 5 has been found quite practical and expedient, particularly in view of the ease with which it permits replacement of lens 7. Thus it is merely necessary to spread blade elements 9, 9' for the removal of one lens and the insertion of another.

However any expedient type of auxiliary lens mounting may be resorted to, in lieu of the frame mounting shown in Fig. 5. Thus the rimless type of support, as shown in Fig. 12 may be effectively utilized in connection with the modification of Figs. 1–4.

Although Figs. 1–4 primarily indicate by way of illustration, merely one temple and an auxiliary lens coordinated therewith, it will be understood that both of the temples may be provided with similarly mounted auxiliary lenses. This understanding likewise applies to the other illustrative modifications of the invention, as shown in Figs. 5–13.

The modification shown by Figs. 6–8 comprises temple 17 provided with a recess or opening 17' comprising a recess and communicating slot which extends completely through the temple between the upper and lower surfaces thereof. The auxiliary lens 18 is shown mounted in frame 19, this mounting being similar to that indicated in Fig. 5. The blade member 20 integral with frame mounting 19 is pivotally associated with pin 21. Said pin 21 extends through temple end portions 23, 24, to which the hinge member 25 is attached. Thus the pivotal association of blade member 20 with pin 21 essentially corresponds with the coordination of blade member 9 with pin 11, as shown in Figs. 1–3. Likewise the operation of the modification shown in Figs. 6 and 7 is analogous to that of the modification comprising Figs. 1–3.

Where a manual functioning of the spectacles of Figs. 6 and 7 is contemplated, it is merely necessary to rotatably actuate the assembly comprising auxiliary lens 18, together with its mounting means 19, 20, by exerting an appropriate force on finger element 22, which projects from the end of temple 17 slightly beyond spectacles frame 2. In this manner the auxiliary lens assembly may be rotated to a zone of vision adjacent to the inner surface of the spectacle lens 3. The return of the auxiliary lens assembly to recess 17' may be attained by exerting an opposite force to finger element 22, thereby rotating the auxiliary lens mounting to its position within the body of the temple 17. Spring clip members may effectively be utilized in this modification for maintaining the auxiliary lens assembly in the zone of vision, as well as for retaining the assembly in rabbet 17'.

Desirably a spring actuating means 26 may be utilized in the modification of Figs. 6 and 7, similarly to that of Figs. 1–3. Thus spring member 26 may be attached at its lower extremity to the bottom portion of pivot pin 21, the other end of the said spring member being appropriately fixed to temple end portion 24. The auxiliary lens assembly may be retained in recess 17' by a clip member 14 affixed to temple 17, similarly to that shown in Fig. 2, under the circumstances spring member 26 being in tension.

Upon retracting clip 14 sufficiently to permit the passage of the auxiliary lens 18 and its mounting 19 from recess 17', the spring member 26 will rotate the assembly to the zone of vision contiguous the inner surface of lens 3. For returning the auxiliary lens assembly to its recess 17', it is rotated against the reaction of spring 26, as by exerting an appropriate force on finger element 22, to its position within temple 17 and, as previously indicated, retained therein through the influence of clip 14.

Pursuant to the modification of Figs. 6 and 7, the auxiliary lens assembly will be subject to visual observation from outside the temple 17, although it is housed within the body of said temple. There is accordingly afforded variable opportunity for enhancing the aesthetic effect of the temple, through such expediency as appropriate ornamentation of the auxiliary lens mounting, color contrast between the temple and the said auxiliary lens mounting, as well as by the configuration of the said auxiliary lens mounting fittedly coordinated with the recess 17'. Moreover as in the case of the modification of Figs. 1–4, the auxiliary lens assembly does not interpose any objectionable protrusion during non-use thereof, by virtue of its being seated within the body of temple 17 as aforesaid.

The structural details of the modification shown in Figs. 9 and 10 are generally similar with that of Fig. 6, especially insofar as pertains to the temple characteristics. Thus in both modifications, the temple is provided with a rabbet and a slot in extension thereof which together embrace the longitudinal dimension of the temple from the said rabbet to the spectacles frame. The principal distinction between these two modifications resides in the relative position of the hinge attachment between the temple and spectacles frame, as well as with respect to the point at which the auxiliary lens assembly pivot is coordinated with the temple.

Thus considering the details of Figs. 9 and 10, the spectacles frame 2, provided with the conventional lens 3, is attached to temple 27 by hinge means 28, the pivotal association of these members being through the expedient of pin 29. Temple 27 embodies a recess 30 and a relatively narrow slot 31 is connected therewith extending to end 32 of the temple. It will be seen that said end portion 32 of temple 27 projects beyond the hinge means 28 as well as beyond the spectacles frame 2.

Auxiliary lens 33 in its frame mounting 34 conforms with the configuration of recess 30 or vice versa, and this auxiliary lens assembly is adapted for positioning within the said recess. At the same time blade member 35, integral with and comprising an extension of mounting frame 34 is positionable within slot 31. The said blade member 35 is pivotally attached to end portion 32 of temple 27 through the expedient of pin 36.

The modification of Figs. 9 and 10 accordingly permit the rotation of the auxiliary lens assembly outwardly from recess 30 to zone of vision 37, which is in front of the spectacles frame 2 and lens 3 mounted therein. As in the case of the modifications hereinabove described, the auxiliary lens together with its mounting may be manually positioned either in said zone 37 or within recess 30. Similarly any appropriate retention means, for example, similar to spring clip 14, may be resorted to as previously described for the purpose of maintaining the auxiliary lens assembly either at the zone of vision or within its recess.

Alternatively and also as heretofore considered in connection with the foregoing modifications of the invention, the auxiliary lens assembly may be supplied with appropriate actuating means, such as spring element 38, coordinated with pivot pin 36 and end portion 32 of temple-bar 27. In this modification, the spring means will desirably function to actuate the auxiliary lens assembly outwardly from temple 27 to zone of vision 37 in front of the spectacles frame or vice versa, as previously indicated. In other words, spring means 38 may be tensioned to return the auxiliary lens and its mounting to recess 30 from zone of vision 37, if this alternative is preferred. It will be understood, as previously pointed out, that the direction in which the spring member actuates the assembly is determined by the positioning of the spring, and the attachment of its respective ends to the pivot pin as well as to the end portion of the temple, the actuating tension being altered by reversing the spring position.

With respect to the aesthetic as well as practical significance of positioning the auxiliary lens and its mounting in the appropriate recess therefor within the temple body, the attributes and advantages referred to in connection with the previous modifications, especially that shown in Figs. 6 and 7, similarly apply to the modification of Figs. 9 and 10.

Referring to Fig. 11, the structural characteristics pertaining to the temple, its attachment to the spectacles frame, and the actuating details, as well as retention means applicable to the auxiliary lens assembly, conform with that described in the consideration of Figs. 1 and 2. Accordingly the respective elements of the temple and spectacles frame shown in Fig. 11 have been designated by similar numerals to that of Figs. 1 and 2. Briefly these comprise temple-bar 1, spectacles frame 2, principal lens 3, the temple and spectacles frame being coordinated at jointure 4 by hinge attachment 5. The essential distinction between Fig. 11 and Fig. 2 pertains to the auxiliary lens and its mounting details.

It will be noted in Fig. 12 that auxiliary lens 39 is provided with the so-called rimless type of mounting, thereby distinguishing from the modification shown in Fig. 5, and is applicable to the various modifications previously described herein that involve a frame support or mounting for the auxiliary lens. Thus the auxiliary lens assembly of Fig. 12 involves lens 39 attached to a conventional type of retaining means, involving bar element 40 extending along one of the relatively short edges of the lens, said bar element being integral with two opposed lug members 41. The said lug members are adapted to receive between them an end portion of the auxiliary lens in clamp-like fashion, and a screw member 42 is passed through one of the lugs as well as an opening in lens 39, and may be threadedly attached to the opposing lug member 42, or to an internally threaded nut positioned outside the said opposing lug member. A blade member 43 extends from and is integral with bar element 40, the said blade element being provided with an opening 44 at the end thereof.

The blade member 43 of Fig. 12 accordingly corresponds with blade member 9 of Fig. 5, and the assembly of Fig. 12 is adapted for rotatable attachment to the various temple modifications in a manner precisely similar to that described hereinabove in the pertinent discussion relating to the assembly of Fig. 5. As previously indicated, the remaining details of construction applicable to Fig. 11, including such elements as the actuating means and spring clip member or members for retaining the auxiliary lens in predetermined position, may be utilized. In brief, the structural and functional characteristics of the various members and elements comprising Fig. 11 may otherwise conform with those of Figs. 1 and 2.

The fundamental construction, which pertains to Figs. 13 and 14, is likewise similar to that indicated in connection with Figs. 1 and 2, and the respective members also have been similarly designated. In fact, the only variation in the modification of Figs. 13 and 14, from that of Figs. 1 and 2, is the cover member 45, which serves to enclose the recess or blind rabbet 13 on the inner surface of temple 1. The said cover member 45 desirably extends longitudinally of the inner surface of the temple to embrace at least the said rabbet 13 and, if desired, it may also serve as a closure for at least a portion of the slot 13'. A spring actuation or closure may be effected by providing cover member 45 with a spring hinge 46, the latter being attached as shown to the upper edge of temple 1 or alternatively to the lower edge of the temple, and adapted to retain the said cover member in closed position over rabbet 13 and the portion of the slot, if any, to which it pertains.

The remaining structural features and details which pertain to Fig. 13 may be entirely similar to those described in reference to Figs. 1 and 2. In effect, Fig. 13 may be considered as a showing of a closure member application to the modification presented by Figs. 1 and 2.

Accordingly the manner in which the modification shown in Fig. 13 functions coincides with that of Figs. 1 and 2. Desirably the spring hinge 46 should manifest a greater force than spring hinge 16 the latter serving to actuate the auxiliary lens assembly. As a result thereof, spring hinge 46 will retain cover member 45 in closed position over rabbet 13, despite the tension effect of spring element 16 adapted to actuate the auxiliary lens assembly out of the said rabbet 13 to the zone of vision 15.

In operation, the cover member 45 may be manually raised, whereupon spring member 16 will cause the auxiliary assembly to rotate from its position in rabbet 13 to the said zone of vision 15.

Since the different modifications shown in the respective figures of the drawings are primarily illustrative of desirable embodiments of the invention, it is apparent that substantial variations may be resorted to within the purview and scope thereof. Thus the auxiliary lens mounting of Fig. 12 may be utilized in connection with any of the respective modifications, and the same applies to the auxiliary lens mounting shown in Fig. 5. Differently stated, either the rimless or the frame mounting may be equally applicable to any of the contemplated embodiments of the temple described, and their combination with the spectacles frame.

Moreover it will be clear that variations from the illustrative embodiments described above may be applied in the structural aspects of the invention, in view of the concept and teaching herein, without deviating from the purport or substance of the invention. For example, the manner of mounting or positioning the auxiliary lens either within the body of the temple or at the zone of vision, may be subject to change, by the adaptation of normal mechanical expedients or skill applied to the aforesaid concept and teaching, within the scope of the invention. Thus the correlation of the auxiliary lens with the temple may comprise a slidable association through the expedient of a channel or groove within the temple recess, with the lens positionable in the recess either through an end of the temple or at an appropriate point in the body thereof. Similarly if desired, the auxiliary lens may be manually or mechanically mounted in the zone of vision by means other than that shown in the illustrative embodiments, as through the resort to retention means attached to the spectacles frame, as well as varied pivotal or other devices.

The material from which the temple is derived may likewise be subject to variation. While it preferably is of a plastic or synthetic resin, it need not be restricted thereto, provided the dimensions thereof are adapted to house the auxiliary lens. Similarly the temple may comprise a combination of a plastic or synthetic resin with metal. By way of illustration, the portion of the temple comprising the open rabbet and slot extending therefrom, within which the blade member of the auxiliary lens mounting may be positioned, can be made of opposing metal strips. Thus one end of each strip may be affixed in any expedient manner to the solid plastic portion of the temple, which may be of a length extending from the ear end thereof to the open rabbet, such as rabbet 13 of Fig. 1. The other end of the respective metal strips will desirably extend to the hinged attachment of the spectacles frame, and may be affixed to appropriate end members, such as 12, 12', shown in Fig. 1. In brief, such a modification in the materials utilized may in effect comprise a structural variation within the purview of the invention.

The general configuration of the temples may be subject to wide diversification. However the width of the temple should be sufficient to house within the body thereof an auxiliary lens sufficient in dimension to function in any predetermined manner, illustratively such as a reading lens for bifocal vision, an anti-glare lens or a magnifying lens. The thickness of the temple should desirably be commensurate with the thickness of the lens in order to satisfy the details hereinabove disclosed. Where the temple modification comprises that having a blind recess or rabbet, the requisite temple thickness may be greater than that which applies to the open type of rabbet. In brief, the pertinent requisites are such as should be clear to one versed in the art in view of the teaching of the present invention.

It will be further understood that the design of the spectacles may be subject to deviation and the same applies to the overall diversity possible with respect to the appearance of the temples. Similarly the design of the auxiliary light transmitting element or lens, as well as its mounting and the pertinent rabbet therefor, may be substantially varied in effecting the artistic appeal and aesthetic significance of the temples.

With respect to the scope of the terminology herein, in view of the foregoing consideration and the appended claims, attention is directed to the generic significance of various terms indicated. Thus the terms "recess" and "slot" are intended to embrace any applicable degree of depth pertaining to the groove or rabbet within which the auxiliary lens mounting is positionable, and includes the modification comprising an opening extending completely through the body of the temple between the upper and lower surfaces thereof. Similarly with respect to the term "lens" or its plural form, pursuant to the disclosure and claims herein, it embraces any light transmitting element, applicable to spectacles or the like, which is adapted as an aid for visual usage, including such elements as are capable of affording anti-glare or magnifying functions, protective expedients, as well as lenses contemplated for improving the visual capacity.

Pursuant to the invention, there is attained an innovation in spectacles, coordinatively embodying therein an auxiliary lens or lenses. Similarly afforded are features of novelty and structure in temples applicable to spectacles. The utility of the invention is manifested by the attributes and enhanced function of the spectacles and temples illustratively shown and described herein with references to the various desirable modifications indicated.

While I have described my invention in accordance with desirable embodiments, it is obvious that many changes may be made in the details of construction, as well as in the combination and arrangement of parts without departing from the spirit or scope of the invention as defined in the following claims.

Having thus set forth my invention, I claim:

1. In a spectacles combination, a spectacles frame having principal lenses coordinated therewith and a pair of temples each hingedly attached to said frame by a pivot association at the end portion of the respective temples, a recess within the body of each said temple and a slot communicating therewith, said recess and slot being positioned on the inner face of the temple, the said slot extending toward the hinged end portion of the temple, an auxiliary lens and mounting means therefor coordinated with each said temple, said lens and mounting means being adapted for substantially complete positioning within the said recess and communicating slot, a pivot means positioned within the said slot, the said mounting means being rotatably supported by and secured to the said pivot means at the end portion of the mounting means positioned within the slot, said pivot means being affixed to the temple in substantial alignment in a transverse plane parallel to the plane of the spectacles frame with the pivot of the said hinged attachment of the temple to the frame, whereby the said mounting means and its auxiliary lens are rotatably positionable in a zone of vision approximate the inner face of the spectacles lens nearest thereto and within the said recess and communicating slot provided therefor.

2. The combination as in claim 1, wherein a spring means is coordinated with each pivot to which the mounting means is secured, for rotatably actuating the said mounting means relative to the zone of vision.

3. The combination as in claim 2, wherein a detent means is provided on the frame and adjacent the recess on the temple for retaining the auxiliary lens and its mounting means in predetermined position.

4. The combination as in claim 1, wherein a spring element is coordinated with each pivot to which the mounting means is secured, for rotatably actuating each mounting means relative to the zone of vision, and wherein the recess is enclosed by a spring actuated cover member hingedly attached to the temple.

5. The combination as in claim 1, wherein the recess and slot communicating therewith extend completely through the body of the temple between the upper and lower surfaces thereof.

6. In a temple for a spectacles frame combination, a hinge means, embodying a pivot, affixed to an end portion of the temple for attaching the same to the spectacles frame, said temple having a longitudinal axis, which is substantially perpendicular to the plane of the spectacles frame, when attached thereto, a recess within the body of said temple and a slot communicating therewith, said recess and slot being positioned on the inner face of the temple, the said slot extending toward the hinged end portion of the temple, an auxiliary lens and mounting means therefor coordinated with the temple, said lens and mounting means being adapted for substantially complete positioning within the said recess and communicating slot, a pivot means positioned within the said slot, the said mounting means being rotatably supported by and secured to the said pivot means at the end portion of the mounting means positionable within the slot, said pivot means being affixed to the temple in substantial alignment in a transverse plane with the pivot of the hinge means, said transverse plane being substantially perpendicular to the longitudinal axis of the temple, whereby the said mounting means is rotatably positionable to and from the recess and communicating slot provided therefor.

7. In a temple as in claim 6, wherein the auxiliary lens is rotatably actuatable relative to its recess by a spring means coordinated with its pivotal mounting means, and wherein the recess is enclosed by a spring actuated cover member in hinged attachment to the body of the temple.

References Cited in the file of this patent

UNITED STATES PATENTS

| | | |
|---|---|---|
| 648,165 | Falardeau | Apr. 24, 1900 |
| 1,881,132 | Rheinberg | Oct. 4, 1932 |
| 2,196,543 | Anderson | Apr. 9, 1940 |
| 2,598,272 | Krimsky | May 27, 1952 |

FOREIGN PATENTS

| | | |
|---|---|---|
| 335,345 | Great Britain | Sept. 25, 1930 |

OTHER REFERENCES

Transactions of American Academy of Ophthalmology and Otolaryngology, pages 359 and 360, vol. of 1948–1949.